(12) United States Patent
Nahrwold et al.

(10) Patent No.: US 11,703,127 B2
(45) Date of Patent: Jul. 18, 2023

(54) SEAL ASSEMBLY AND METHOD FOR MONITORING A SEAL ASSEMBLY

(71) Applicant: CARL FREUDENBERG KG, Weinheim (DE)

(72) Inventors: Olaf Nahrwold, Ludwigshafen (DE); Stefan Sindlinger, Weinheim (DE); Boris Traber, Hirschberg (DE); Tanja Claus, Mannheim (DE); Thomas Kramer, Zotzenbach (DE); Frank Lauer, Rauenberg (DE); Rainer Kreiselmaier, Ludwigshafen (DE); Guido Hohmann, Weinheim (DE); Christoph Naumann, Viernheim (DE)

(73) Assignee: CARL FREUDENBERG KG, Weinheim (DE)

( * ) Notice: Subject to any disclaimer, the term of this patent is extended or adjusted under 35 U.S.C. 154(b) by 176 days.

(21) Appl. No.: 17/309,971

(22) PCT Filed: Jan. 9, 2020

(86) PCT No.: PCT/EP2020/050387
§ 371 (c)(1),
(2) Date: Jul. 7, 2021

(87) PCT Pub. No.: WO2020/148151
PCT Pub. Date: Jul. 23, 2020

(65) Prior Publication Data
US 2022/0056999 A1    Feb. 24, 2022

(30) Foreign Application Priority Data
Jan. 17, 2019   (DE) .................... 10 2019 101 173.6

(51) Int. Cl.
*F16J 15/3296* (2016.01)
*F16J 15/34* (2006.01)

(52) U.S. Cl.
CPC ....... *F16J 15/3296* (2013.01); *F16J 15/3492* (2013.01)

(58) Field of Classification Search
CPC .......................... F16J 15/3296; F16J 15/3492
See application file for complete search history.

(56) References Cited

U.S. PATENT DOCUMENTS

2006/0022665 A1   2/2006  Lutaud
2006/0214380 A1*  9/2006  Dietle .................. F16J 15/3244
                                                       277/559

(Continued)

FOREIGN PATENT DOCUMENTS

DE     102010042340 A1   4/2012
EP       2557339 A1      2/2013

(Continued)

*Primary Examiner* — Gilbert Y Lee
(74) *Attorney, Agent, or Firm* — Leydig, Voit & Mayer, Ltd.

(57) ABSTRACT

A seal assembly includes: a seal element; a part to be sealed; and a measuring arrangement for monitoring an aging of the seal element. The seal element is held on the part so as to provide a contact stress between the seal element and the part. The seal element has a contact face with which the seal element bears against the part. At least one measuring component of the measuring arrangement is integrated in each case into the seal element and into the part. The contact face of the seal element has a surface geometry with depressions.

13 Claims, 8 Drawing Sheets

(56) References Cited

U.S. PATENT DOCUMENTS

| | | |
|---|---|---|
| 2009/0087303 A1 | 4/2009 | Ruggiero |
| 2009/0290971 A1 * | 11/2009 | Shamseldin .......... F04D 29/124 415/118 |
| 2012/0119448 A1 | 5/2012 | Stewart |
| 2017/0009550 A1 | 1/2017 | Leuchtenberg |
| 2018/0112779 A1 | 4/2018 | Nahrwold |

FOREIGN PATENT DOCUMENTS

| | | | |
|---|---|---|---|
| EP | 3139072 A1 * | 3/2017 | |
| EP | 3312480 A1 | 4/2018 | |
| WO | WO-2019086778 A1 * | 5/2019 | ............. F16J 15/064 |

* cited by examiner

SEAL ASSEMBLY AND METHOD FOR MONITORING A SEAL ASSEMBLY

CROSS-REFERENCE TO PRIOR APPLICATIONS

This application is a U.S. National Phase application under 35 U.S.C. § 371 of International Application No. PCT/EP2020/050387, filed on Jan. 9, 2020, and claims benefit to German Patent Application No. DE 10 2019 101 173.6, filed on Jan. 17, 2019. The International Application was published in German on Jul. 23, 2020 as WO 2020/148151 under PCT Article 21(2).

FIELD

The invention relates to a seal assembly, to a method for monitoring a seal assembly, and to the use of a seal assembly.

BACKGROUND

A wide variety of seals made of plastics and elastomeric material are known from the prior art. For example, static seals are formed by flat seals, O rings, flap seals or other molded seals.

DE 10 2010 042 340 A1 describes a flap seal for a flap valve, which can also be referred to as a disk valve. In order to know the state of a seal assembly or to avoid the failure of a seal, it is desirable to monitor the state of the seal assembly. Different measuring methods for this purpose are known from the prior art. It is particularly desirable to integrate a measuring arrangement required for this purpose into the seal assembly, since this allows a particularly compact construction and cost-effective manufacturing.

US 2012/0119448 A1 describes an O-ring with an integrated measuring arrangement. The measuring arrangement is intended to allow wear, thermal change, physical damage and structural destruction of the seal to be monitored. For this purpose, two electrically conductive layers are integrated into the seal element, and an evaluation of the measured capacitance can take place.

The difficulty with such a measuring arrangement is that, because distance changes between the conductive layers are only minimal, only minimal changes in capacitance can be measured. A very high accuracy of the measuring arrangement is thus required, which then entails the risk of measuring inaccuracies due to distortions.

SUMMARY

In an embodiment, the present invention provides a seal assembly, comprising: a seal element; a part to be sealed; and a measuring arrangement configured to monitor an aging of the seal element, wherein the seal element is held on the part so as to provide a contact stress between the seal element and the part, wherein the seal element has a contact face with which the seal element bears against the part, wherein at least one measuring component of the measuring arrangement is integrated in each case into the seal element and into the part, and wherein the contact face of the seal element has a surface geometry with depressions.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
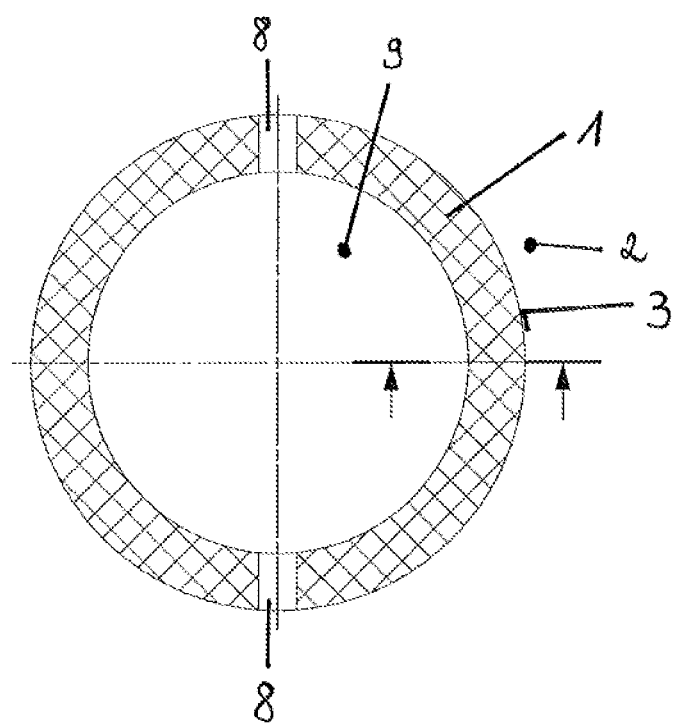
FIG. 1 a sectional view through a seal element

In an embodiment, the present invention provides a seal assembly which has a simple construction, can be produced simply and inexpensively in terms of manufacturing technology and can also be used to detect even small changes in the seal assembly. A further object is to describe a method for monitoring a seal assembly which allows a reliable conclusion to be drawn about the aging behavior and in particular the setting behavior of a seal element.

In an embodiment, the present invention provides a seal assembly having the features described herein.

According to the invention, it has been recognized as advantageous to measure the contact stress of the seal element indirectly, namely by way of a distance measurement between the seal element and the part to be sealed. For this purpose, the seal assembly has a specific construction.

The seal assembly according to the invention has a seal element and a part to be sealed. The seal element can, for example, be a sealing ring. The seal element can in particular be manufactured from an elastomer. The part to be sealed can, for example, be a housing or a machine element. The seal element is held on the part in such a way that there is a contact stress between the seal element and the part, and the seal element has a contact face with which it bears against the part. The seal assembly furthermore has a measuring arrangement for monitoring the aging of the seal element. The aging includes in particular the setting behavior of the seal element but can also include wear by abrasion. Advantageously, at least one measuring component of the measuring arrangement is integrated in each case into the seal element and the part. A simple, compact and insensitive construction of the measuring arrangement is thereby implemented. The contact face of the seal element advantageously has a surface geometry with depressions. The measuring element of the seal element can be situated in the depressions themselves or be integrated even deeper into the seal element so that a further layer of the seal element is situated between the measuring element and the contact face. The contact face is particularly preferably situated in the region of a high contact stress between the seal element and the part to be sealed, that is to say where there is a high pressing force. The contact face is thus situated directly in the force flow of the pressing force. It is preferably situated in the main force fit. Alternatively, it is situated in the secondary force fit. A pressing face, onto which a pressing force is applied to the seal element, is situated on a side of the seal element opposite the contact face.

In an advantageous development of the seal assembly according to the invention, a measuring component of the part is integrated into the part so as to be adjacent to the contact face of the seal element. The measuring component can, for example, be a conductive surface or a Hall sensor. If the part is a housing, this housing can also be made of an electrically conductive material, and the entire housing can form the measuring component. If the distance measurement is implemented by a capacitive measurement, the capacitance to the ground of the housing can be measured, which advantageously simplifies the design of the measurement chain.

In an advantageous development of the seal assembly, a measuring component of the seal element is designed as a structure integrated into the volume of the seal element. The structure can be designed in particular as a face, as a grid, as lines or bands or as a body. The integrated structure can be either electrically conductive or magnetic. If the integrated structure is electrically conductive, a capacitive measurement is made possible. If the integrated structure is magnetic, a measurement by means of a Hall sensor using the Hall effect is made possible.

In a particularly advantageous and therefore preferred development of the seal assembly according to the invention, the integrated structure is formed from the material of the seal element, with the addition of additives. In other words, the electrically conductive or magnetic structure is formed from the seal material by adding, for example, electrically conductive or magnetic or magnetized particles in a locally limited way.

In the seal assembly according to the invention, an insulating layer, in particular made of the material of the seal element, i.e., of seal material, can be located between the integrated structure and the contact face of the seal element.

In an alternative embodiment, a stud, i.e., an elevation, of seal material can be located in a depression in the surface geometry, and the integrated structure can be applied to the end face of the stud. Such a design means that the integrated structure for distance measurement is situated closer to the measuring component of the part and that a higher measuring accuracy and signal quality can thus be achieved with a non-noisy measuring signal.

In a particular embodiment of the seal assembly, the integrated structure is introduced into the depressions in the surface geometry. Such a seal assembly is particularly favorable in terms of manufacturing technology, since the seal assembly can be produced from the seal material in a first production step, and the structure can be applied into the depressions in the seal assembly by means of coating, spraying or printing in a second production step.

In the seal assembly described above, the surface geometry with its depressions can form bumps, honeycombs, grids, grooves or notches. The size of the depressions can in particular be in the order of 0.5 to 2 mm.

The invention also relates to a method for monitoring a seal assembly, in particular as described above, wherein the distance between the measuring component of the seal element and the measuring component of the part is determined. The aging of the seal element and in particular the setting behavior and abrasion can then be deduced from the measured distance. For example, a capacitance measurement or a change in current in the Hall sensor can be used as the measuring method.

In the method according to the invention for monitoring a seal assembly, the distance is detected indirectly at different load states, in particular at two different load states, and the difference between the distances is calculated. The indirect measurement can take place by capacitance measurement or by using a Hall sensor. If the seal assembly is designed as a valve seal, the load states can be "valve open" and "valve closed." In the embodiment as a flap seal of a flap valve, the load states are "valve flap open" and "valve flap closed." It has surprisingly been found that, in contrast to the measurement of the absolute values of the distances, the evaluation of the difference between the distances allows better conclusions to be drawn about the state of the seal assembly. While the absolute values of the distances change only slightly over time and can thus hardly be evaluated, the difference between the distances results in a greater and thus better evaluable value. In other words, the geometric changes caused by relaxation of the seal element in the static state are very small. The greater difference between two load cases is therefore used. Relaxation is understood here to mean the release of tension in the seal element and the return to its non-stressed state, or the response behavior of a plastic or elastomeric body to an effective force as a function of time. This provides a time-dependent response behavior as soon as the effective force is removed and reaches a final value or absolute value. This final value changes by aging.

In a development of the method according to the invention for monitoring a seal assembly, the time required for the seal element to relax between the different load states can additionally be detected. If, for example, the two load states "valve closed" and "valve open" are used, the time required for the relaxation of the seal element after the opening of the valve can be detected. That is, the time is detected during which the seal element relaxes after the valve has been opened and no pressing force is thus applied to the seal element by the valve flap.

It is particularly advantageous if the value of the distance and/or of the difference and/or of the time determined when the seal assembly is put into use is stored in a data memory of the measuring arrangement. This means that the initial values which apply to a new and intact seal assembly without aging phenomena are stored. If the distance and/or difference and/or time are detected at a later point in time, these current values can be compared with the stored initial values. In addition, the value of the distance in the "valve closed" load state can also be used in this manner to detect abrasion or wear of the sealing face between the valve flap and seal element, since the value of the distance increases with increasing abrasion. Wear leads to a smaller dimension of the seal element, which in turn causes a smaller effective force when the valve flap is closed.

In a development of the method for monitoring a seal assembly, a signal is output when there is a deviation above a defined and stored threshold value or even with a greatly increasing drift of the value of the distance and/or difference and/or time. The signal can, for example, be a warning signal or a prompt to change the seal element or an automated replacement part order, etc.

The invention also relates to the use of a seal assembly as described above as a flap seal in a flap valve. In this case, a valve flap or valve disk is mounted pivotably within a sealing ring, and the sealing ring has a sealing face on its inner diameter and is accommodated in a housing at its outer diameter. The contact face is situated between the outer diameter of the sealing ring and the housing so that the specific surface geometry with depressions is present and the measuring arrangement is positioned here.

The described invention and the described advantageous developments of the invention, even in combination with one another insofar as this is technically sensible, also constitute advantageous developments of the invention.

The invention is to be explained in more detail using the example of a flap seal. A flap seal becomes leaky when the contact stress decreases and falls below the contact pressure of the applied media pressure. It is therefore interesting to predict when the seal will become leaky, in the sense of predictive maintenance, so that the customer can change the seal in good time before leakage occurs. The question is therefore: How can the loss of contact stress be detected as continuously as possible? The concept underlying the invention is to detect a geometric change that is measurable as a change in length.

In order to achieve a change in length of sufficient size that can be measured, structuring of the seal assembly by means of depressions is used, which brings about surprising improvements.

The simulation shows that the geometric changes due to physical relaxation in the static state are very small. Measuring the geometric differences in only this load case can only be resolved with difficulty here. Much greater differences are measured when the difference between the load cases of an open and a closed valve flap is considered. Without aging effects, these differences should always remain the same.

It can be seen that, if the depressions are larger, the changes in length which occur when the flap is closed or opened are also larger.

As a result of the aging, i.e., loss of the relaxation capability of the material (i.e., the restoring forces), the seal material springs back more slowly when the valve flap is opened, this being measurable in a slower change in distance (Aa per unit time t). The absolute level of Aa will also always be lower in the aged seal material, since the restoring forces are lost due to physical and chemical aging.

It has been found to be advantageous that a change in distance can be measured either in the open state of the valve flap (as absolute value of Aa) or when the valve flap is opened as a shape of the curve as a function of time. That is, a measurement of how quickly the seal body returns to the unloaded shape after the load is removed.

FIG. 1 shows a sectional view through a seal element 1, namely a sealing ring of a flap seal. The two through-openings 8 at the top and at the bottom are provided for the axis of rotation of the valve flap 9. The valve flap 9 is thus located inside the seal element 1, and on its inner diameter, the seal element 1 has a sealing face which seals to the valve flap 9. At its outer diameter, the seal element 1 is held on a part 2, for example integrated into a groove of a housing. The housing 2 is not shown in FIG. 1, only its position is indicated. At its outer diameter, the seal element 1 has a contact face 3 with which the seal element 1 bears against the part 2. In the region of this contact face 3, there is a high contact stress between the seal element 1 and the part 2. Partial sections through the seal element 1 at the point indicated by arrows are shown in more detail in FIGS. 4*a*-4*e*.

Figure 2:
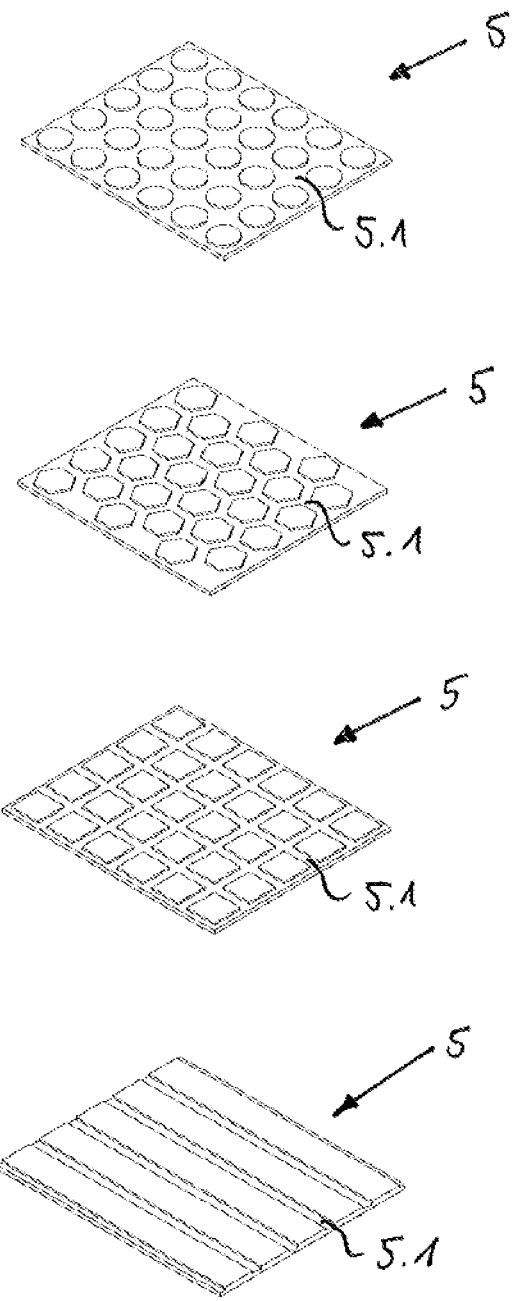
FIG. 2 various possible embodiments of the surface geometry of the contact face of the seal element FIGS. 3a-3b a seal assembly with two different measuring arrangements FIGS. 4a-4e possible variants for designing the integrated structure of the measuring component of the seal element FIG. 5 the compression, relaxation and aging of a seal element FIG. 6 a graph of the relaxation behavior of a seal element over time

FIG. 2 shows various possible embodiments of the surface geometry 5 of the contact face 3 of the seal element 1. The depressions 5.1 can, for example, be situated between circular, honeycomb-shaped or square elevations. Alternatively, the depressions 5.1 are formed by linear grooves.

Figure 3A:
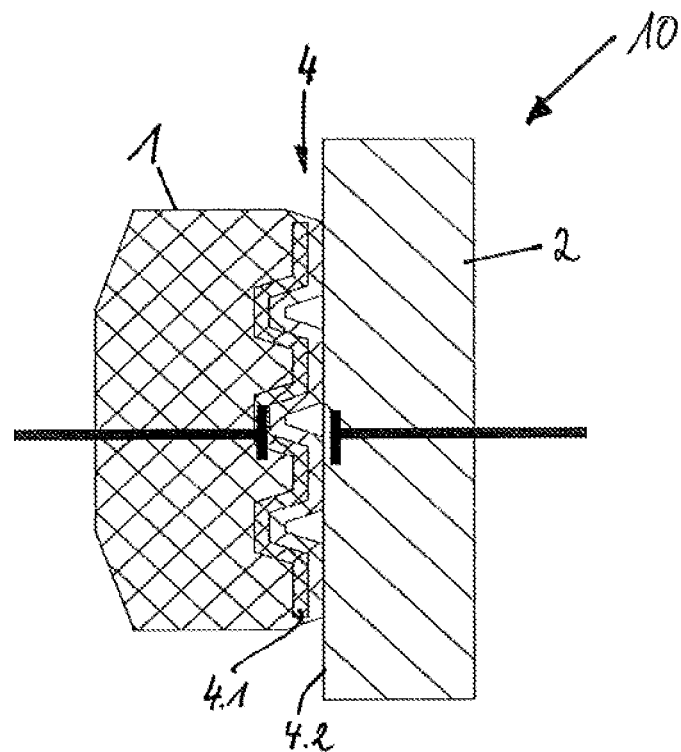
Figure 3B:
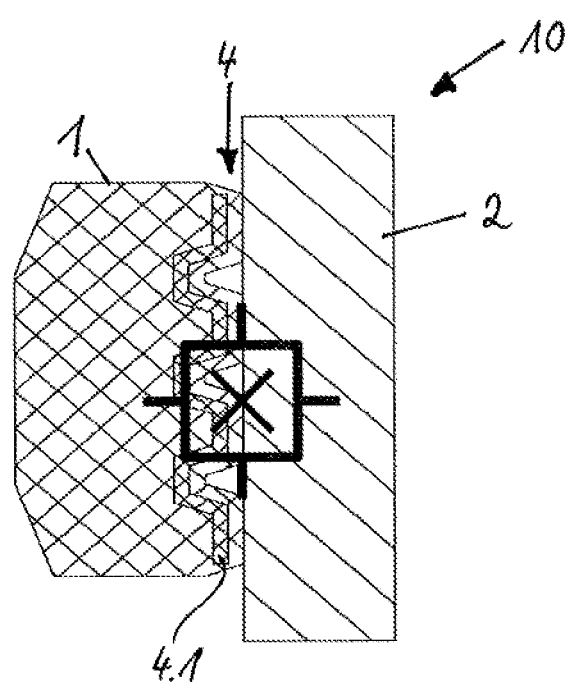

FIGS. 3*a-b* show a seal assembly 10 with two different measuring arrangements 4.

FIG. 3*a* shows a seal assembly 10 in cross section with a surface geometry 5 according to the invention: A conductive layer following the surface geometry 5 is used as the integrated structure of the measuring component 4.1 of the seal element 1. In addition, the circuit symbol for a capacitor is also shown here, which is intended to illustrate that a capacitance measuring device is used as the measuring arrangement 4. A relative movement of the electrical layer 4.1 relative to the measuring component 4.2 of the part 2 then brings about a measurable change in the capacitance. This change in the capacitance can be used to infer a change in the distance between the measuring components 4.1, 4.2.

FIG. 3*b* likewise shows a seal assembly 10, but in this case the circuit symbol for a Hall sensor is shown, which is intended to illustrate that a Hall sensor is used as the measuring arrangement 4. Instead of a conductive layer, a magnetic layer is used as the measuring component 4.1. A relative movement of the magnetic layer relative to the field of the Hall sensor then brings about a measurable change in current. A change in the distance between the measuring components 4.1, 4.2 can be inferred from this change in current.

FIGS. 4*a-e* show possible variants for the design of the measuring component (4.1) of the seal element 1 as an integrated structure.

Figure 4A:
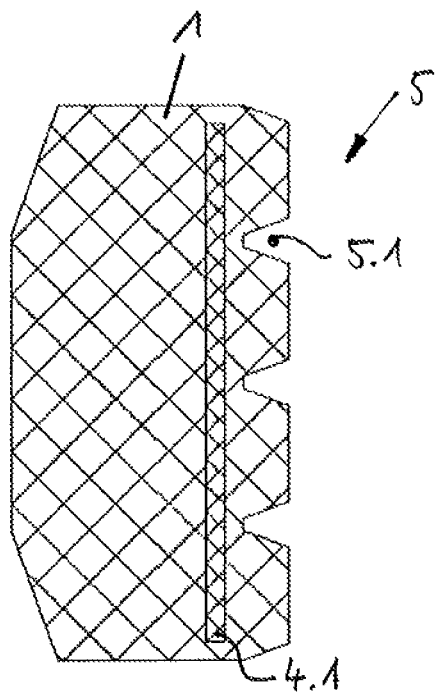

In FIG. 4*a*, the integrated structure 4.1 is arranged as a planar layer just behind the surface geometry 5. This simplifies the manufacturing process.

Figure 4B:
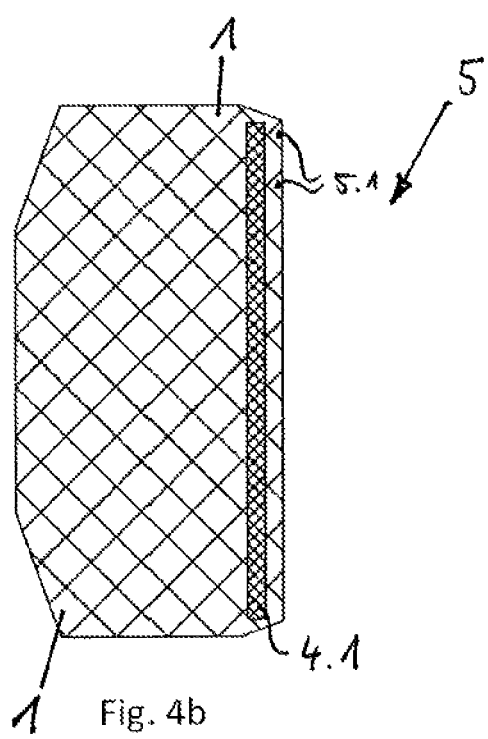

In FIG. 4*b*, only very small depressions 5.1 are provided, in contrast to FIG. 4*a*.

Figure 4C:
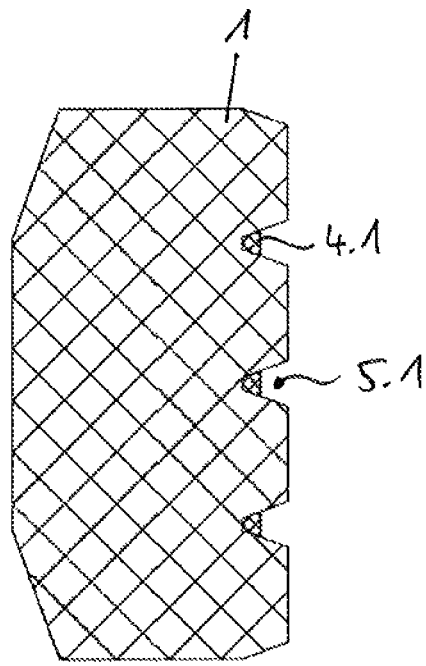

FIG. 4*c* shows an arrangement in which the integrated structure 4.1 was subsequently introduced in the form of lines into the depressions 5.1, i.e., into the channels of the surface geometry 5. The lines can be produced by coating or printing, for example.

Figure 4D:
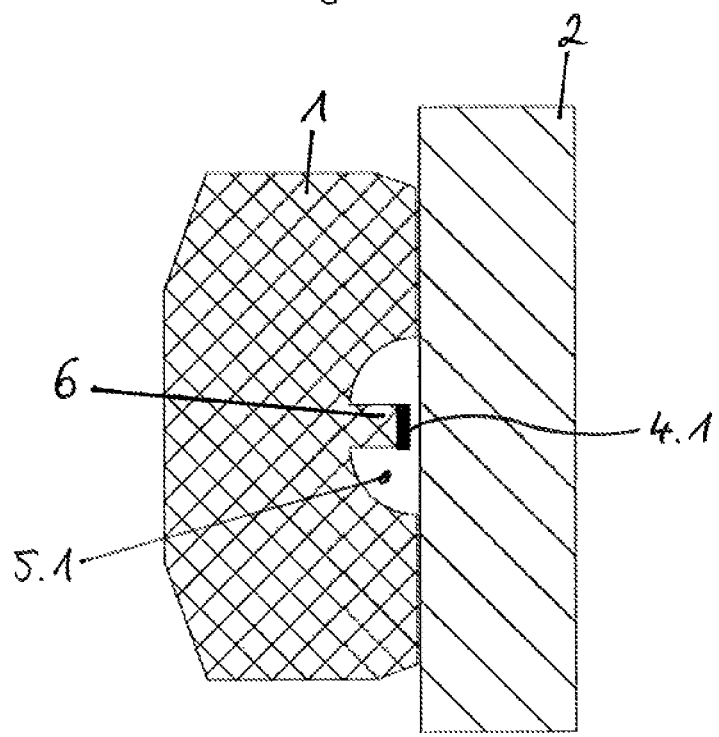

FIG. 4*d* shows in cross section a seal assembly 10 in which a raised stud 6 is provided in the depression 5.1. That is to say that the stud 6 is raised relative to the depression 5.1 but still has a distance from the part 2 at its end face. An integrated structure 4.1 is mounted on the end face of the stud 6. This integrated structure 4.1 has no contact with the housing 2 and thus experiences no contact stresses. Due to the deformations when a valve flap 9 opens and closes, the distance a between the integrated structure 4.1 and the housing 2 changes. The air located between the integrated structure 4.1 on the stud 6 and the housing 2 acts as an insulator between them. Such a construction of the seal assembly 10 is used when the design of the measuring arrangements 4 allows only a small distance between the measuring components 4.1, 4.2.

Figure 4E:
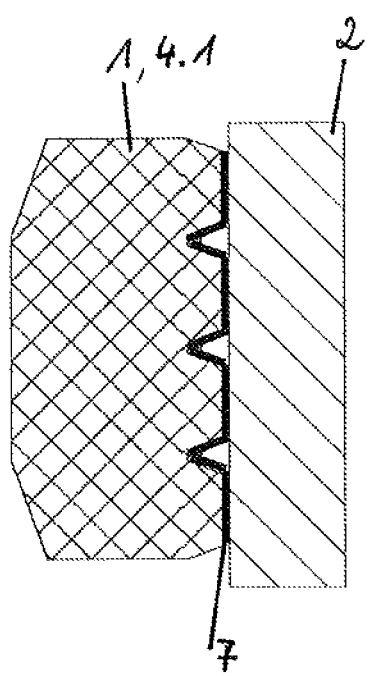

FIG. 4*e* shows an alternative design of the seal assembly (10).

In this case, the body of the seal element 1 itself is used as the measuring component 4.1 of the seal element 1. For a capacitive measuring method, the seal element 1 is made of an electrically conductive seal material. When a Hall sensor is used, the seal element 1 is made of a magnetic seal material. The seal element 1 is provided with an insulating coating 7 on the contact face 3.

Whether electrically conductive or magnetic materials are used for the measuring component 4.1 of the seal element 1 depends on the measuring method to be used. Electrically conductive materials are used for the capacitive for measuring method, and magnetic materials are used when using a Hall sensor. When the measuring component of the seal element is designed as an integrated structure, it likewise consists of the seal material of the seal element 1 but with the addition of electrically conductive or magnetic particles.

Figure 5:
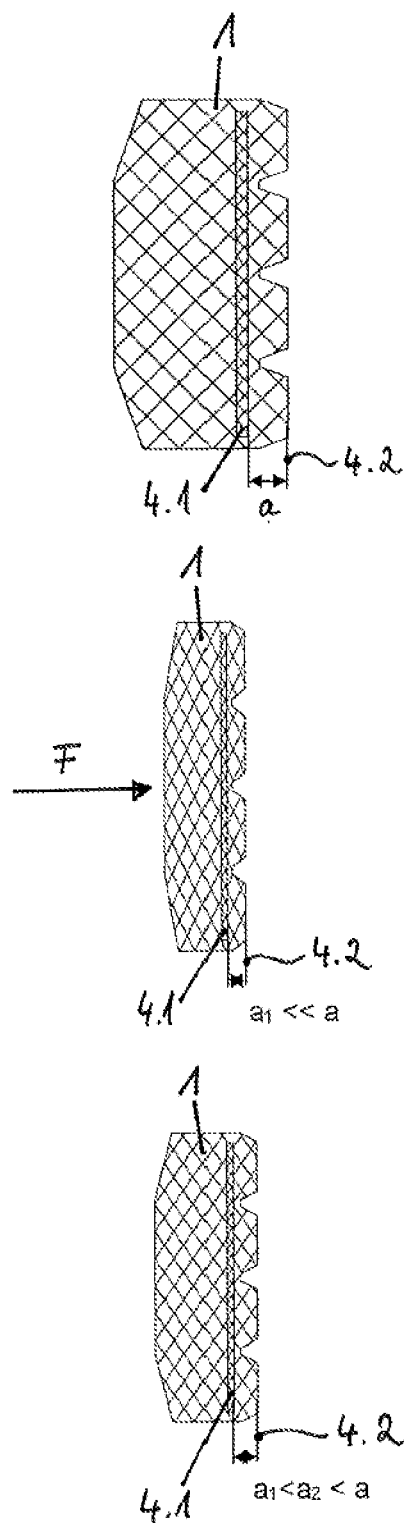

FIG. 5 shows the compression, relaxation and aging of a seal element 1, namely the change in the distance (a) from the surface of the housing 2, or more precisely the change in the distance (a) between the measuring components 4.1, 4.2 of the seal element 1 and the part 2. This is illustrated using the example of a flap seal of a flap valve:

In the top illustration, a valve is open and the seal element 1 is not compressed but is in the relaxed state. The state is shown in a new seal assembly 10, at or shortly after the initial mounting.

In the middle illustration, a valve is closed and the seal element 1 is compressed by an applied pressing force F. This results in a smaller distance a1.

In the bottom illustration, a valve is also open, but as a result of the decline in the contact stress after a certain period of use, the seal element 1 has not returned to the initial state and a2 is smaller than a.

Figure 6:
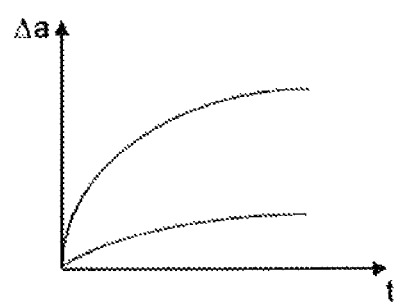

FIG. 6 shows a graph of the relaxation behavior of a seal element 1 over time. The upper curve shows the behavior in a new seal assembly 10. The lower curve shows the behavior in a seal assembly 10 after a certain period of use. Two curves of the measured distance a between the measuring components 4.1, 4.2 of the seal element 1 and the part 2 during the relaxation of the seal element 1, i.e., over time after the valve has been opened, are shown. In the upper curve, it can be seen that the seal element 1 is restored well and quickly shortly after the opening of the valve. The lower curve shows the behavior of the seal element 1 when the restoring behavior has significantly declined. The restoring behavior is significantly slower and the seal element 1 can no longer be restored so well.

The evaluation of the graph thus yields the following: As a result of the aging, i.e., the loss of the relaxation capability of the material of the seal element and its restoring forces, the seal material springs back more slowly when the valve flap is opened; this is measurable in a slower change in distance (Aa per unit time t). The absolute level of Aa will also always be lower in the aged seal material, since the restoring forces are lost due to physical and chemical aging.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Seal element
2 Part to be sealed
3 Contact face
4 Measuring arrangement
4.1 Measuring component of seal element (e.g., integrated structure)
4.2 Measuring component of part
5 Surface geometry
5.1 Depressions
6 Stud
7 Coating
8 Through-opening
9 Position of valve flap
10 Seal assembly
a Distance
F Pressing force

The invention claimed is:

1. A method for monitoring a seal assembly, comprising:
providing the seal assembly, the seal assembly comprising:
a seal element;
a part to be sealed; and
a measuring arrangement configured to monitor an aging of the seal element,
wherein the seal element is held on the part so as to provide a contact stress between the seal element and the part,
wherein the seal element has a contact face with which the seal element bears against the part,
wherein the measuring arrangement comprises a measuring component of the part and a measuring component of the seal element, the measuring component of the part being integrated into the part, and the measuring component of the seal element being integrated into the seal element, and
wherein the contact face of the seal element has a surface geometry with depressions; and
determining a distance between the measuring component of the seal element and the measuring component of the part,
wherein the distance is detected at different load states, and a difference between distances is calculated, and
wherein a time required for the seal element to relax between different load states is detected.

2. The method for monitoring the seal assembly according to claim 1, wherein the measuring component of the part is adjacent to the contact face of the seal element.

3. The method for monitoring the seal assembly according to claim 1, wherein the measuring component of the seal element comprises a structure integrated into a volume of the seal element.

4. The method for monitoring the seal assembly according to claim 3, wherein the integrated structure is electrically conductive or magnetic.

5. The method for monitoring the seal assembly according to claim 3, wherein the integrated structure comprises a material of the seal element and additives.

6. The method for monitoring the seal assembly according to claim 3, wherein the seal assembly further comprises:
an insulating layer comprising a material of the seal element, the insulating layer being located between the integrated structure and the contact face of the seal element.

7. The method for monitoring the seal assembly according to claim 3, wherein the integrated structure is introduced into the depressions of the surface geometry.

8. The method for monitoring the seal assembly according to claim 1, wherein the contact face of the seal element is situated in a region of a high contact stress.

9. The method for monitoring the seal assembly according to claim 1, wherein the surface geometry with the depressions forms bumps, honeycombs, grids, grooves, or notches.

10. The method for monitoring the seal assembly according to claim 1, wherein a value of the distance and/or of a difference and/or of a time determined when the seal assembly is put into use is stored in a data memory of the measuring arrangement.

11. The method for monitoring the seal assembly according to claim 10, wherein a currently determined value of the distance and/or of a difference and/or of a time is compared with a stored value.

12. The method for monitoring the seal assembly according to claim 1, wherein, if there is a deviation above a threshold value, a signal is output.

13. The method for monitoring the seal assembly according to claim 1, further comprising:

using the seal assembly as a flap seal in a flap valve.

\* \* \* \* \*